United States Patent
Campbell

(10) Patent No.: US 8,340,611 B2
(45) Date of Patent: Dec. 25, 2012

(54) NOISE BASED QUALITY ESTIMATION FOR SIGNALS

(75) Inventor: Neil Colin Campbell, Cambridge (GB)

(73) Assignee: MStar Semiconductor, Inc., Hsinchu Hsien (TW)

( * ) Notice: Subject to any disclaimer, the term of this patent is extended or adjusted under 35 U.S.C. 154(b) by 674 days.

(21) Appl. No.: 12/513,526

(22) PCT Filed: Dec. 4, 2007

(86) PCT No.: PCT/GB2007/004643
§ 371 (c)(1),
(2), (4) Date: May 5, 2009

(87) PCT Pub. No.: WO2008/071916
PCT Pub. Date: Jun. 19, 2008

(65) Prior Publication Data
US 2010/0069016 A1    Mar. 18, 2010

(30) Foreign Application Priority Data
Dec. 14, 2006  (GB) .................................. 0624978.3

(51) Int. Cl.
*H04B 17/00* (2006.01)
(52) U.S. Cl. .................................................. 455/226.1
(58) Field of Classification Search .................. None
See application file for complete search history.

(56) References Cited

U.S. PATENT DOCUMENTS

| | | | |
|---|---|---|---|
| 6,985,544 B2 * | 1/2006 | Matsui et al. | 375/347 |
| 7,116,981 B2 * | 10/2006 | Jeon et al. | 455/450 |
| 7,356,071 B2 * | 4/2008 | Li et al. | 375/147 |
| 7,848,392 B2 * | 12/2010 | Bai et al. | 375/148 |
| 2004/0110510 A1 | 6/2004 | Jeon et al. | |
| 2004/0264604 A1 * | 12/2004 | Malette et al. | 375/340 |
| 2006/0251152 A1 | 11/2006 | Li et al. | |

FOREIGN PATENT DOCUMENTS
EP    1619807 B1    11/2007

OTHER PUBLICATIONS

Chinese Patent Office, Office Action 960414TW, May 30, 2011, pp. 1-8.
International Search Report, PCT/GB2007/004643, Apr. 7, 2008, 3 pages.

* cited by examiner

*Primary Examiner* — Lincoln Donovan
*Assistant Examiner* — Khareem E Almo
(74) *Attorney, Agent, or Firm* — Edell, Shapiro & Finnan, LLC

(57) ABSTRACT

A method of calculating the noise power in a received signal containing a pilot channel, the method comprising estimating the power of the received signal, estimating the power of the pilot channel and calculating the noise power as a function of the estimated signal and the pilot channel powers. The noise power thus deduced may be used as a parameter of a function defining a channel quality indicator. The invention extends to corresponding apparatus.

19 Claims, 2 Drawing Sheets

NOISE BASED QUALITY ESTIMATION FOR SIGNALS

BACKGROUND

The present invention relates the assessment of noise in received communications signals and to the assessment of channel quality.

In 3GPP TS 25.214 V6.7.1 "Physical layer procedures (FDD)", the UE is required to report the channel quality indicator (CQI) for HS-DSCH rate adaptation. The definition of CQI is given as follows (TS 25.214 Section 6A.2):

"Based on an unrestricted observation interval, the UE shall report the highest tabulated CQI value for which a single HS-DSCH sub frame formatted with the transport block size, number of HS-PDSCH codes and modulation corresponding to the reported or lower CQI value could be received in a 3-slot reference period ending 1 slot before the start of the first slot in which the reported CQI value is transmitted and for which the transport block error probability would not exceed 0.1."

The CQI values are tabulated according to UE category and have been designed to correspond to 1 dB steps in the required Signal-to-Interference plus Noise Ratio (SINR) that is required to achieve the specified BLER of 10%. In static conditions such as those implied by the definition of CQI, the relationship between the SINR and the corresponding CQI value has been established as being linear (see, for example, Brouwer, et al., "Usage of link-level performance indicators for HSDPA network-level simulations in E-UMTS," *Spread Spectrum Techniques and Applications,* 2004 *IEEE Eighth International Symposium on,* pp. 844-848).

The UE is also supplied with the power offset between the HS-DSCH channels and the CPICH (Common Pilot Channel) and thus the determination of the CQI value can be based on the CPICH SINR.

Methods for estimating the CPICH SINR based on the despread CPICH symbols are known in the art, see e.g. "CPICH Processing for SINR Estimation in W-CDMA System", WO2005093961.

SUMMARY OF THE INVENTION

According to one aspect, the invention provides a method of calculating the noise power in a received signal containing a pilot channel, the method comprising estimating the power of the received signal, estimating the power of the pilot channel and calculating the noise power as a function of the estimated signal and pilot channel powers.

Noise measurements made in this way can be used to evaluate a CQI without processing the CPICH. Avoiding a need to process the CPICH reduces delay in CQI estimation since processing the CPICH will delay the CQI estimation by at least the CPICH spreading factor. The computational load can also be reduced in the need to process the CPICH can be avoided.

In certain embodiments, the function defining the noise power has a form that can be attained by applying a linear regression technique to an expression linking the noise power, the received signal power and the pilot channel power.

In certain embodiments, the pilot channel power is obtained from magnitudes of tap values in an estimate of the response of the channel through which the signal is acquired.

In certain embodiments, the signal is transmitted using a transmit diversity scheme and the estimated pilot channel power is obtained by summing pilot channel powers estimated for elements of the signal issuing from different locations.

In certain embodiments, the function defining the noise power is a function of power estimates of the pilot channel arising at different time-points.

In certain embodiments the function defining the noise power is a function of power estimates of the received signal arising at different time-points.

The noise power as determined using the techniques of the invention can be used to calculate a channel quality indicator for a received signal by evaluating a function for said indicator having the noise power as an argument. The noise power may be filtered or averaged prior to being used to evaluate the function defining the CQI. The function defining the CQI may also have as an argument the estimated power of a pilot channel contained within the signal. The pilot channel power can be filtered or averaged prior to being used in evaluating the function defining the CQI. The function defining the CQI may also have as an argument the estimated power of the received signal. The power of the received signal can be filtered or averaged prior to being used to evaluate the function defining the CQI. The form of the function defining the CQI can vary in dependence upon the power of the received signal.

Above, certain elements of the invention have been described from the method perspective. For the avoidance of doubt, the invention also extends to apparatus for and also to programs for performing methods according to the invention.

BRIEF DESCRIPTION OF THE DRAWINGS

By way of example only, certain embodiments of the invention will now be described, by reference to the accompanying drawings, in which.

DETAILED DESCRIPTION

Figure 1:
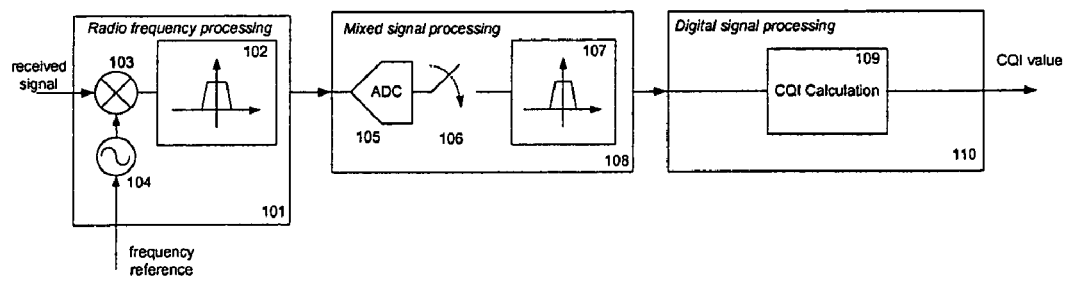
FIG. 1 illustrates schematically a UE device.
Figure 2:
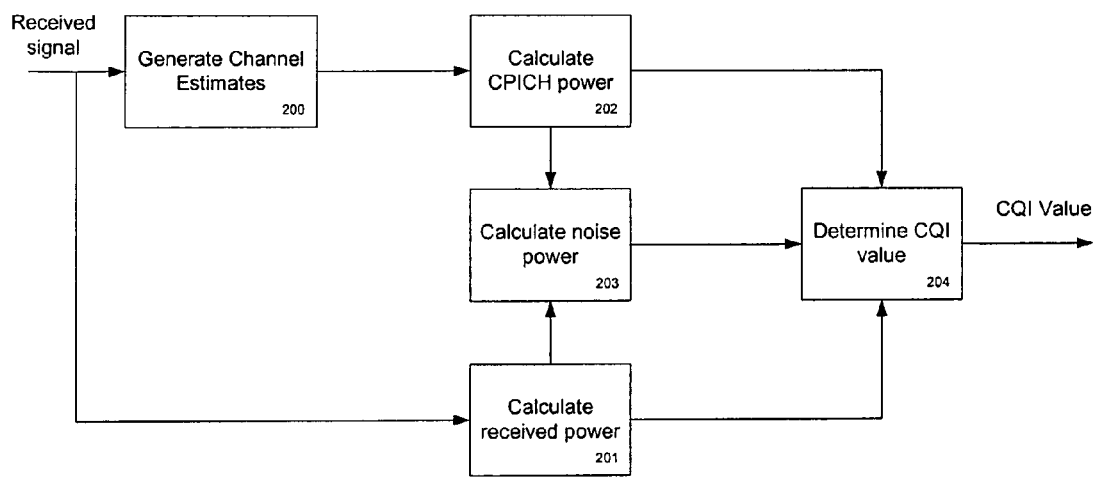
FIG. 2 illustrates schematically processing stages in the CQI calculation unit of the UE device of FIG. 1.

FIG. 1 depicts various processing stages that form part of a UE such as a mobile telephone. It should be noted that the blocks shown in FIG. 1 represent processing operations performed on a received signal but do not necessarily correspond directly to physical units that may appear within a practical implementation of a receiver (the same applies to the processing stages shown in FIG. 2). The first stage 101 corresponds to the radio frequency processing. During the radio frequency processing, the received signal is down-converted to baseband using a mixer 103. The reference frequency used to drive the mixer is generated by an oscillator 104. Following this carrier down-conversion, the signal is low-pass filtered 102 and then passed to the mixed-signal processing stage 108.

The mixed signal processing includes Analogue-to-Digital Conversion (ADC) 105, sampling 106 and low pass filtering 107. The resulting signal, which is now digital, is supplied to the digital signal processing stage 111 where it is processed such that the transmitted information can be recovered. The received signal is then processed by the CQI estimation unit 109, the different processing stages of which are presented in FIG. 2.

The received signal is a W-CDMA chip stream that has passed through a transmission link and can be expressed as:

$$r(k) = \alpha_{cpich}\sum_{l=0}^{P} h(l)c(k-l) + \sum_{l=0}^{P} h(l)\sum_{m=1}^{M}\alpha_m s_m(k-l) + \zeta(k)$$

where $\{h(k)\}_{k\in\{0,\ldots,P\}}$ represent the different propagation channel taps. $\zeta(k)$ models the combination of thermal noise and interference from adjacent cells. $\zeta(k)$ is assumed to be Additive White Gaussian Noise (AWGN) with variance equal to $\sigma^2$. The samples $c(k)$ denote the unit amplitude CPICH sequence transmitted with amplitude $\alpha_{cpich}$ and $s_m(k)$ is the unit amplitude data sequence for the mth channel transmitted with amplitude $\alpha_m$.

In CQI estimation unit 109, the received signal is first processed by unit 200 in order to generate raw channel estimates. These initial channel estimates can be generated, for example, by correlating the received signal with the known pilot sequence as described in the above equations. It should however be noted that the application of the present invention is not restricted to this case. It would be possible to use other techniques, such as linear Least-Square fitting (*Digital Communications*, John G. Proakis, $2^{nd}$ *edition*, McGraw-Hill International), in order to derive these channel estimates.

In case of transmit diversity, either open-loop or closed-loop, the unit 200 will generate a set of initial channel estimates for each transmit antenna.

The CIR is derived by correlating the received signal with the pilot sequence:

$$\hat{h}(l) = \frac{1}{N}\sum_{k=0}^{N-1} r(k)c^*(k-l)$$
$$= \alpha_{cpich}h(l)$$

where N is the spreading factor of the W-CDMA pilot signal. It is assumed, without loss of generality, that $$\sum_{l=0}^{P}|h(l)|^2 = \beta$$

where $\beta$ represents the fading loss (or gain) of the transmission channel.

The received signal is also processed by unit 201 to calculate the received signal power level in the following manner:

$$P_{rx} = \frac{1}{T}\sum_{n=0}^{T-1}|r(n)|^2$$

The generated channel estimates are processed by unit 202 in order to generate an estimate of the received CPICH power level.

Since the generated channel estimates are scaled by the magnitude of the CPICH channel, an estimate of the received CPICH power level can be calculated in the following manner:

$$P_{cpich} = \sum_{l=0}^{P}|\hat{h}(l)|^2$$

$P_{cipch}$ can also be formulated as:

$$P_{cpich}\alpha_{cpich}^2\beta$$

This can be rearranged to give:

$$\beta = \frac{P_{cpich}}{\alpha_{cpich}^2}$$

In the case of transmit diversity, either open-loop or closed-loop, the total received CPICH power level is calculated as the sum of the CPICH power estimated for each transmit antenna.

In one embodiment of the invention, unit 203 processes the received signal power and the estimated CPICH power to calculate the noise power. The noise power can be calculated based on the following observation; if the received power, $P_{rx}$, is calculated over the same interval as used to calculate the channel estimates, the following relationship holds:

$$P_{rx}(i) = P_t\beta(i) + \sigma^2$$

And we can substitute for $\beta$ to give:

$$P_{rx}(i) = \frac{P_t}{\alpha_{cpich}^2}P_{cpich}(i) + \sigma^2$$

where $P_t$ is the total transmitted power level:

$$P_t = \alpha_{cpich}^2 + \sum_{m=1}^{M}\alpha_m^2$$

which is assumed to remain constant and $\sigma^2$ is the noise power. The index, i, represents the ith observation of the two quantities.

One method of calculating the noise power based on two or more observations of $P_{rx}(i)$ and $P_{cpich}(i)$ is by solving the linear equation:

$$P_{rx} = \alpha P_{cpich} + \sigma^2$$

where $$P_{rx} = [P_{rx}(i), P_{rx}(i-1), \ldots, P_{rx}(i-k+1)]^T$$

$$P_{cpich} = [P_{cpich}(i), P_{cpich}(i-1), \ldots, P_{cpich}(i-k+1)]^T$$

with k being the number of observations. Reformulating the above equation gives:

$$P_{rx} = [P_{cpich}\ 1]\begin{bmatrix}\alpha\\\sigma^2\end{bmatrix} = Xv$$

which is solved for the two unknowns as:

$$v = (X^T X)^{-1} X^T P_{rx}$$

For the simplest case of 2 observations (k=2), this gives the result:

$$\hat{\sigma}^2(i) = \frac{1}{2}\left((P_{rx}(i) + P_{rx}(i-1)) - \frac{(P_{cpich}(i) + P_{cpich}(i-1))(P_{rx}(i) - P_{rx}(i-1))}{P_{cpich}(i) - P_{cpich}(i-1)}\right)$$

During a CQI measurement period, the three measures, $P_{rx}$, $P_{cpich}$ and $\hat{\sigma}^2$, will be calculated multiple times and in one embodiment of the invention, the average quantities:

$$\overline{P}_{rx} = \frac{1}{K}\sum_{i=1}^{K} P_{rx}(i)$$

$$\overline{P}_{cpich} = \frac{1}{K}\sum_{i=1}^{K} P_{cpich}(i)$$

$$N_o = \frac{1}{K}\sum_{i=1}^{K} \hat{\sigma}^2(i)$$

are calculated by unit 204.

Based on these three measures, unit 204 calculates a CQI value for the nth measurement period as:

$$CQI(n) = f(\overline{P}_{rx}(n), \overline{P}_{cpich}(n), N_o(n))$$

where the mapping, f(●), can be determined by experimentation. In one embodiment of the invention, mapping f(●) is modelled as a linear relationship:

$$CQI(n) = \Lambda \cdot 10\log_{10}\left(\frac{\overline{P}_{cpich}(n)}{N_o(n)}\right) + \Upsilon + \Gamma$$

where Λ and Y are determined by experimentation and Γ is the difference between the CPICH power level and the HS-DSCH power level. It will be recalled from the introduction that Γ is a known parameter that is signalled to the UE.

The linear relationship described above may not accurately describe the mapping f(●) and thus another embodiment of the invention uses the following transfer function:

$$CQI(n) = \begin{cases} \Lambda_1 \cdot 10\log_{10}\left(\frac{\overline{P}_{cpich}(n)}{N_o(n)}\right) + \Upsilon_1 + \Gamma & \overline{P}_{rx}(n) < \Delta \\ \Lambda_2 \cdot 10\log_{10}\left(\frac{\overline{P}_{cpich}(n)}{N_o(n)}\right) + \Upsilon_2 + \Gamma & \overline{P}_{rx}(n) \geq \Delta \end{cases}$$

where Δ is determined by experimentation and represents the received signal level at which the CQI mapping changes.

This approach can clearly be extended to any approximation of the actual CQI mapping, including, but not limited to using one or more lookup tables.

The invention claimed is:

1. A method of calculating the noise power in a received signal containing a pilot channel, the method comprising estimating the power of the received signal, estimating the power of the pilot channel and calculating the noise power as a function of the estimated signal and pilot channel powers, wherein the function is of a form obtained by applying a linear regression technique to an expression linking the noise power, the received signal power and the pilot channel power; and calculating a channel quality indicator for the received signal by evaluating a second function defining the channel quality indicator and using the noise power as an argument in the second function.

2. A method according to claim 1, wherein the received signal is acquired through a channel and the estimated pilot channel power is obtained from magnitudes of tap values in an estimate of the response of the channel.

3. A method according to claim 1, wherein the received signal has been sent using a transmit diversity scheme and the estimated pilot channel power is obtained by summing pilot channel powers estimated for elements of the signal issuing from different locations.

4. A method according to claim 1, wherein the function is a function of power estimates of the pilot channel arising at different time-points.

5. A method according to claim 1, wherein the function is a function of power estimates of the received signal arising at different time-points.

6. A method according to claim 1, wherein the noise power is filtered or averaged prior to use in evaluating the second function.

7. A method according to claim 1, wherein the received signal includes a pilot channel and the second function has the pilot channel's estimated power as an argument and the estimated pilot channel power is filtered or averaged prior to use in evaluating the second function.

8. A method according to claim 1, wherein the second function has the received signal's estimated power as an argument and the estimated received signal power is filtered or averaged prior to use in evaluating the function.

9. A method according to claim 1, wherein the form of the second function varies dependent upon the estimated power of the received signal.

10. Apparatus for calculating the noise power in a received signal containing a pilot channel, the apparatus comprising means for estimating the power of the received signal, means for estimating the power of the pilot channel and means for calculating the noise power as a function of the estimated signal and pilot channel powers, wherein the function is of a form obtained by applying a linear regression technique to an expression linking the noise power, the received signal power and the pilot channel power; and means for evaluating a second function defining the channel quality indicator by using the noise power as an argument in the second function.

11. Apparatus according to claim 10, wherein the received signal is acquired through a channel and the estimated pilot channel power is obtained from magnitudes of tap values in an estimate of the response of the channel.

12. Apparatus according to claim 10, wherein the received signal has been sent using a transmit diversity scheme and the estimated pilot channel power is obtained by summing pilot channel powers estimated for elements of the signal issuing from different locations.

13. Apparatus according to claim 10, wherein the function is a function of power estimates of the pilot channel arising at different time-points.

14. Apparatus according to claim 10, wherein the function is a function of power estimates of the received signal arising at different time-points.

15. Apparatus according to claim 10, wherein the noise power is filtered or averaged prior to use in evaluating the second function.

16. Apparatus according to claim 10, wherein the received signal includes a pilot channel and the second function has the pilot channel's estimated power as an argument and the estimated pilot channel power is filtered or averaged prior to use in evaluating the second function.

17. Apparatus according to claim 10, wherein the second function has the received signal's estimated power as an argument and the estimated received signal power is filtered or averaged prior to use in evaluating the function.

18. Apparatus according to claim 10, wherein the form of the second function varies dependent upon the estimated power of the received signal.

19. The method of claim 1, further comprising causing, using a program, data processing equipment to perform the estimating steps and the calculating step.

* * * * *